(12) United States Patent
Fujita

(10) Patent No.: US 6,809,270 B2
(45) Date of Patent: Oct. 26, 2004

(54) WEIGHING APPARATUS

(75) Inventor: Hitoshi Fujita, Shiga (JP)

(73) Assignee: Takata Corporation, Tokyo (JP)

( * ) Notice: Subject to any disclaimer, the term of this patent is extended or adjusted under 35 U.S.C. 154(b) by 113 days.

(21) Appl. No.: 10/095,988

(22) Filed: Mar. 13, 2002

(65) Prior Publication Data

US 2002/0129977 A1 Sep. 19, 2002

(30) Foreign Application Priority Data

Mar. 14, 2001 (JP) ......................................... 2001-071803

(51) Int. Cl.[7] .......................... B60R 22/00; G60F 17/00; G01G 19/00
(52) U.S. Cl. ...................... 177/25.19; 701/45; 180/273; 280/735
(58) Field of Search .............................. 177/25.19, 136, 177/144; 180/273; 280/735; 701/45

(56) References Cited

U.S. PATENT DOCUMENTS

| | | | | |
|---|---|---|---|---|
| 4,301,879 A | * | 11/1981 | Dubow ..................... | 177/25.19 |
| 4,576,244 A | * | 3/1986 | Zeigner et al. .......... | 177/25.19 |
| 4,660,662 A | * | 4/1987 | Katz ............................ | 177/50 |
| 4,831,242 A | * | 5/1989 | Englehardt et al. ...... | 177/25.19 |
| 5,650,930 A | * | 7/1997 | Hagenbuch ................. | 177/141 |
| 6,365,846 B1 | * | 4/2002 | Kono et al. .............. | 177/25.18 |
| 6,369,338 B1 | * | 4/2002 | Kimura ..................... | 177/25.19 |
| 6,373,001 B1 | * | 4/2002 | Kono et al. .............. | 177/25.18 |
| 6,462,287 B1 | * | 10/2002 | Mikesell ................... | 177/25.18 |
| 6,617,530 B1 | * | 9/2003 | Lin ........................... | 177/25.19 |
| 6,649,848 B2 | * | 11/2003 | Kriger ...................... | 177/25.13 |

* cited by examiner

*Primary Examiner*—Randy W. Gibson
(74) *Attorney, Agent, or Firm*—Foley & Lardner

(57) ABSTRACT

A weighing apparatus by which a past record of measured weight values can be known later is provided. Weight measured by a weight sensor is inputted to a MPU via an I/O (input-output) unit. The MPU stores the inputted weight data in a memory together with the date and time which a timepiece circuit indicates, either when the MPU determines that the weight is being measured (for example, when the weight equals or exceeds a predetermined value) or when a command to record the weight data is given by an external unit such as a personal computer (PC) via an I/O unit. The stored weight data and date-time data are read from the memory by the MPU when a readout command is given by the external unit, and are outputted to the external unit via the I/O unit.

8 Claims, 2 Drawing Sheets

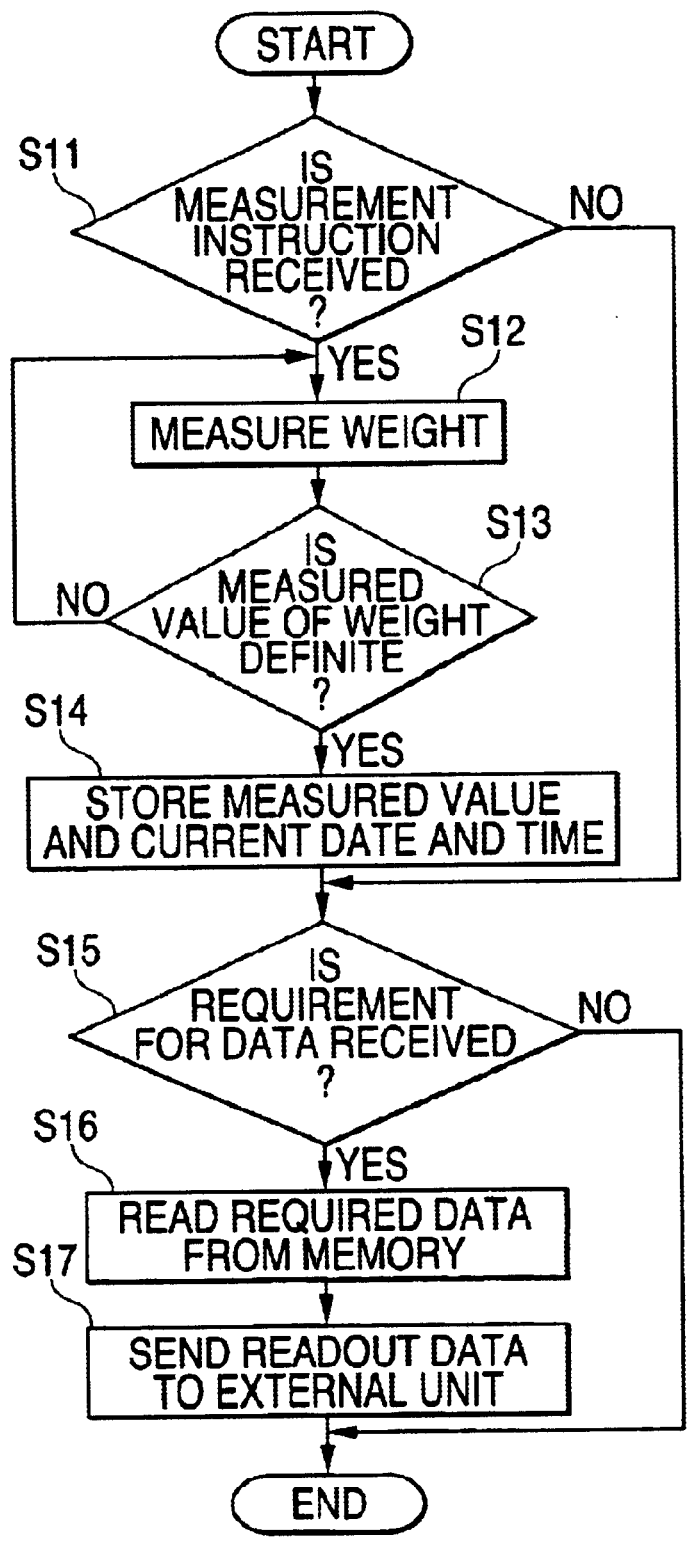

WEIGHING APPARATUS

BACKGROUND

The present invention relates to a weighing apparatus for measuring body weight, the weight of an object mounted on a seat of an automobile, or any similarly situated object.

Generally, weighing apparatuses display measured weight at the time when it is measured in an analog or digital manner. In an automobile or similar vehicle, the weight of a passenger sitting on a seat is measured and the expansion of an airbag or similar device is controlled according to the measured weight.

However, although the weight at the time when it is measured can be obtained by such a weighing apparatus, the measurement history does not remain. Therefore, there is a problem in the weighing apparatus because the measured value must be recorded every time it is measured when intending to record the history. Measured values must be recorded manually in the case of, for example, dieting because it is important to record the change of weight. In an automobile, information on the time when a driver other than the usual driver drove the automobile is sometimes required. However, no system which meets such a requirement has yet been put into practical use.

SUMMARY OF THE INVENTION

Accordingly, an object of the present invention is to provide a weighing apparatus that provides for a past record of measured weights to be saved for later use.

According to an embodiment of the present invention, a weighing apparatus is provided. The apparatus includes a weight sensor; a timepiece; a storage; and an external input-output device. The weighing apparatus is configured so that the storage may store either a value of a measurement by the weight sensor and a time of the measurement when weight is measured or another value of the measurement by the weight sensor and a time of receipt of a storage command when the storage command is received from the external input-output device. The apparatus is also configured to output to the outside the value of the measurement by the weight sensor and the corresponding time when an output command is received from the external input-output device.

Through use of the above-described weighing apparatus, a history of measured values can be easily obtained. A value measured by the weight sensor and a time (including a date) of the measurement are stored in the storage every time weight is measured. The value measured by the weight sensor is stored in storage every time the value measured by the weight sensor becomes equal to or exceeds a predetermined value. Another value measured by the weight sensor and a time of the input of a storage command from the external input-output device are stored in the storage every time the storage command from the external input-output device is inputted. The value measured by the weight sensor and the corresponding time when the value is outputted to the outside when an output command is received from the external input-output device is also stored in storage. With this arrangement, the history of the values previously measured can be easily obtained.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 2 is a flowchart of an operation of a MPU shown in FIG. 1.

DETAILED DESCRIPTION

Figure 1:
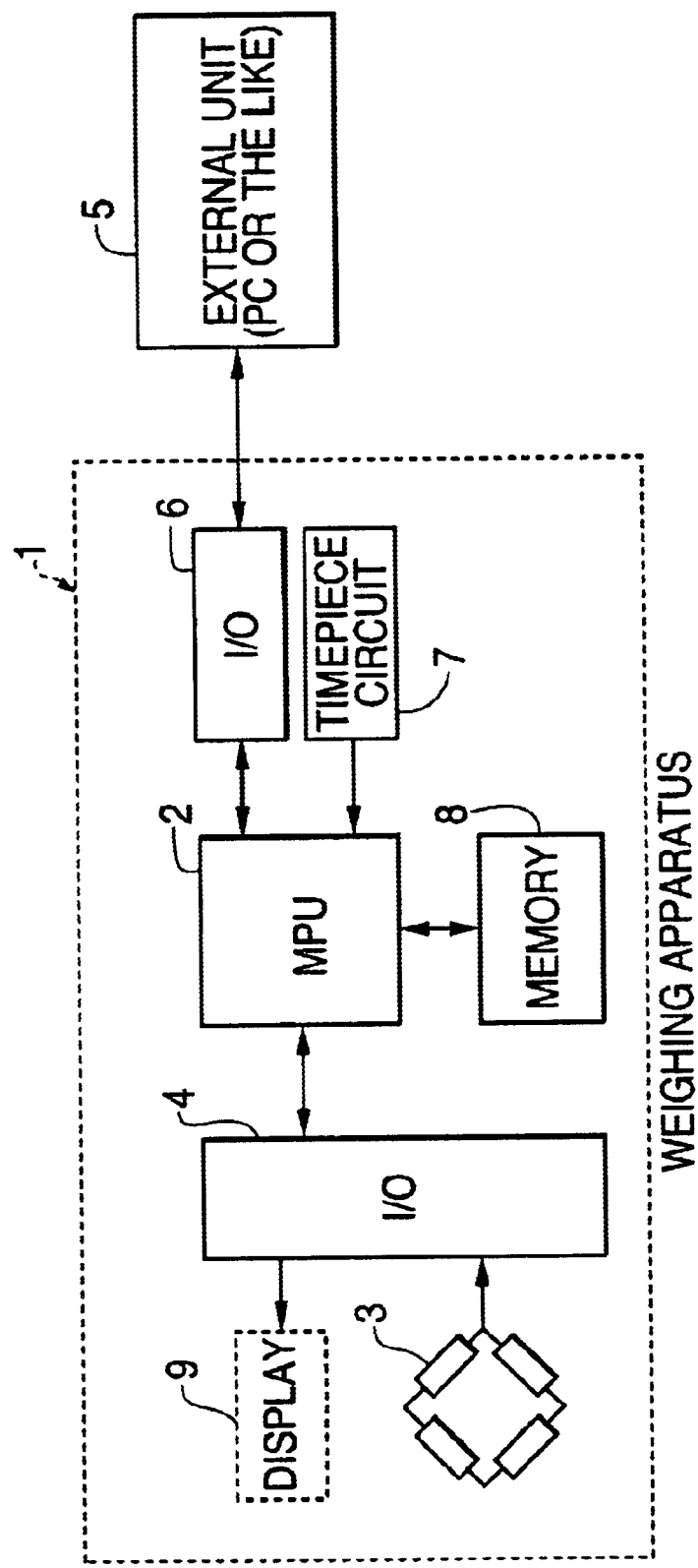
FIG. 1 is a block diagram of an outline of a weighing apparatus according to an embodiment of the present invention.

Embodiments according to the present invention are described below with reference to the drawings. FIG. 1 is a block diagram of the outline of a weighing apparatus according to an embodiment of the present invention. A major component of a weighing apparatus 1 is a MPU (micro processing unit) 2.

A value of weight measured by a weight sensor 3 is inputted to the MPU 2 via an I/O (input-output) unit or device 4. The MPU 2 stores the inputted weight data in a memory 8 together with the date and time indicated by a timepiece or clock circuit 7, either when the MPU 2 determines that the weight is being measured (for example, when the weight equals or exceeds a predetermined value) or when a command to record the weight data is given by an external unit 5 such as a personal computer (PC) via an I/O unit 6.

The stored weight data and date-time data are read from the memory 8 by the MPU 2 when a readout command is given by the external unit 5 and are outputted to the external unit 5 via the I/O unit 6. The measurement data may be displayed on a display 9 by the MPU 2 via the I/O unit 4. Alternatively, the display 9 may be omitted.

FIG. 2 is a flowchart showing an operation of the MPU 2 shown in FIG. 1. The steps shown in the flowchart may be repeated at a predetermined frequency. In step S11, it is determined whether or not a measurement instruction has been received from the external unit 5. When it is determined that the measurement instruction has not been received, the process proceeds to step S15.

When it is determined that the measurement instruction has been received, the output from the weight sensor 3 is inputted in step S12. In step S13, it is determined whether or not the measured value of the weight is definite. The measured value of weight is determined to be definite when, for example, the measured value does not vary beyond a predetermined range for a predetermined time. When the measured value of the weight is not determined to be definite, the process proceeds back to step S12 and the output from the weight sensor 3 is again inputted.

When the measured value is determined to be definite, the process proceeds to step S14, and the measured value is stored in the memory 8 together with the current date and time. In the next step of S15, it is determined whether or not a requirement for data is received from the external unit 5. When it is determined that the requirement for data is not received, the process is completed.

When it is determined that the requirement for data is received, the process proceeds to step S16, and the required data are read from the memory 8. In step S17, the readout data are sent to the external unit, and the process is completed.

As described above, a past record of measured values of the weight can be known later, according to the present invention.

The priority application, Japanese Patent Application No. 2001-071803 filed on Mar. 14, 2001, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as farther embodiments of the present invention. The scope of the present invention is to be defined as set forth in the following claims.

What is claimed is:

1. A weighing apparatus comprising:

a weight sensor connectable to an automobile and configured to weigh a passenger of the automobile;

a timepiece;

a storage; and an external input-output device, wherein the weighing apparatus is configured to store a value of a measurement by the weight sensor and a time of the measurement when weight is measured or when the storage command is received from the external input-output device.

2. A weighing apparatus comprising:

a weight sensor;

a timepiece;

a storage; and an external input-output device, wherein the weighing apparatus is configured so that when an output command is received to output a weight measured by the weight sensor to the external input-output device the measured weight and, the corresponding time when the output command is received from the external input-output device are stored in the storage.

3. A method for developing a history of measured weights comprising the steps of:

determining whether a measurement instruction is received by a microprocessor;

measuring a weight of an object using a weight sensor;

determining whether the measured weight is definite;

recording a date and time when the measuring step occurred; and storing the measured weight and the date and time to thereby develop a history of measured weights.

4. The method of claim 3, wherein the storing step is performed when the measured weight exceeds a predetermined value.

5. The method of claim 3, wherein the storing step is performed when a command to record the weight data is received by the microprocessor.

6. The method of claim 3, further comprising the step of providing the measured weight to an output device.

7. The method of claim 5, wherein the step of storing is performed whenever a command to provide the measured weight to an output device is received by the microprocessor.

8. The method of claim 3, wherein the measured weight is definite when it does not vary beyond a predetermined range for a predetermined time.

* * * * *